(12) United States Patent
Ikedo et al.

(10) Patent No.: US 6,296,217 B1
(45) Date of Patent: Oct. 2, 2001

(54) MOVABLE BODY SUPPORTING MECHANISM

(75) Inventors: Yuji Ikedo; Masamitsu Ohkawara; Kenjiro Oizumi; Katsuhiro Onodera; Hideo Ito, all of Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/406,374

(22) Filed: Sep. 28, 1999

(30) Foreign Application Priority Data

Sep. 29, 1998 (JP) .................................................. 10-274581

(51) Int. Cl.[7] .................................................... E04G 3/00
(52) U.S. Cl. ........................................ 248/292.12; 403/59
(58) Field of Search ........................ 248/292.12, 292.14, 248/292.1, 284.1, 285.1, 286.1, 287.1; 403/59, 61, 105; 74/29, 109

(56) References Cited

U.S. PATENT DOCUMENTS 3,447,388 * 6/1969 Darnell ...................................... 74/29

4,691,888 * 9/1987 Cotterill ............................... 248/284.1
5,292,118 * 3/1994 Allen et al. ..................... 248/284.1 X

FOREIGN PATENT DOCUMENTS

| 0 581 518 A2 | 2/1994 | (EP) . |
| 2 693 935 | 1/1994 | (FR) . |
| 04172652 | 6/1992 | (JP) . |
| 05189860 | 7/1993 | (JP) . |
| 09288857 | 11/1997 | (JP) . |

* cited by examiner

Primary Examiner—Ramon O. Ramirez
(74) Attorney, Agent, or Firm—Pitney, Hardin, Kipp & Szuch LLP

(57) ABSTRACT

A movable body supporting mechanism supports a movable body (12, 42) to be moved in a direction orthogonal to a flat surface, on which a fixed member (11, 41) and the movable body are both mounted. The movable body supporting mechanism is provided with: a lever (13a, 13b, 46a, 46b) rotatably linked to the fixed member and the movable body; a movable body gear (18a, 18b, 52) mounted on the movable body at a side thereof opposed to the fixed member; and a pinion (14a, 14b, 44a, 44b) engaged with the movable body gear and driven in conjunction with the lever.

9 Claims, 11 Drawing Sheets

FIG. 15
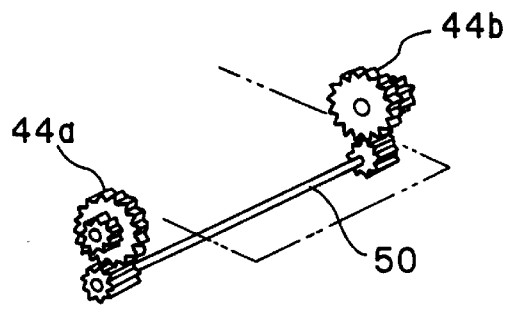
FIG. 16A
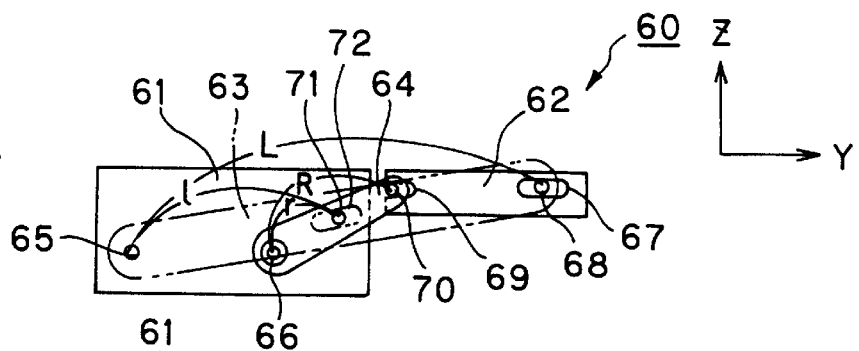
FIG. 16B
FIG. 17
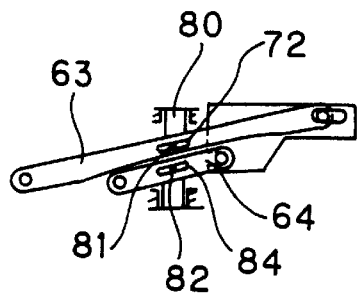

PRIOR ART

MOVABLE BODY SUPPORTING MECHANISM

BACKGROUND OF THE INVENTION

1. Field of the Invention

The present invention relates to a movable body supporting mechanism for supporting a movable body which is moved in a direction orthogonal to a flat surface on which a fixed member and the movable body are both mounted and, and more particularly relates to a movable body supporting mechanism which is effective when it is applied to a disc clamping mechanism for a disk player and a disc selecting mechanism for a changer.

2. Description of the Related Art

For example, a movable body for carrying a disc and a fixed member such as a magazine and the like, in which a plurality of discs are accommodated, are both mounted in a changer. Then, the movable body is moved in a direction orthogonal to a flat surface on which the fixed member and the movable body are both mounted, and is raised and lowered up to a position corresponding to a particular disc. In general, since the discs are accommodated in parallel to each other in many cases, it is desirable to move the movable body while keeping it in parallel to the discs so that the relative position thereof to the respective discs are identical to each other.

The inventor of the present application knows a mechanism shown in FIG. 18 as a mechanism of supporting this kind of movable body. That is, a base 3 is projected from a fixed member 1 toward underneath a movable body 2, three screw shafts 4a, 4b and 4c are stood up from this base 3, and nuts screwed on the screw shafts 4a, 4b and 4c are mounted in the movable body 2. The synchronous drive of the three screw shafts 4a, 4b and 4c enables the movable body 2 to be moved in a Z axis direction on coordinates. At this time, the movement of the movable body 2 in an X or Y axis direction or a rotation around each axis is restricted.

Also, the inventor of the present application knows a movable body supporting mechanism shown in FIG. 19 in which a movable body 2 and a base 3 projected from a fixed member 1 are linked to each other through a X-shaped link 4. This movable body supporting mechanism also enables the movable body 2 to be supported movably only in a Z axis direction on coordinates.

However, each of the above mentioned movable body supporting mechanisms has a large number of parts constituting the supporting mechanism and is difficult in assembling. Moreover, in order to support the movable body 2, it is necessary to project the base 3 projected toward underneath the movable body 2 from the fixed member 1. Since it is difficult to ensure a rigidity and an accuracy of the base 3, it is impossible to obtain a movable body supporting mechanism suitable for a miniaturization and a high accuracy.

SUMMARY OF THE INVENTION

It is therefore an object of the present invention to provide a movable body supporting mechanism, which can support a movable body to be moved in a direction orthogonal to a flat surface on which the movable body and a fixed member are both mounted by use of a rather simple configuration, and which can further support the movable body without projecting a base portion from the fixed member.

In the following summary of the invention, although reference numerals for the accompanying drawings are appended in respective brackets after corresponding constitutional elements for the sake of easy understanding, the invention is never limited by these reference numerals or the accompanying drawings.

The above object of the present invention can be achieved by a first movable body supporting mechanism for supporting a movable body (12, 42) to be moved in a direction orthogonal to a flat surface on which a fixed member (11, 41) and the movable body are both mounted. The first movable body supporting mechanism is provided with: a lever (13a, 13b, 46a, 46b) rotatably linked to the fixed member and the movable body; a movable body gear (18a, 18b, 52) mounted on the movable body at a side thereof opposed to the fixed member; and a pinion (14a, 14b, 44a, 44b) engaged with the movable body gear and driven in conjunction with the lever.

According to the first movable body supporting mechanism, by virtue of a rather simple configuration of the lever, the pinion etc., it is possible to support the movable body to be moved in the direction orthogonal to the flat surface on which the fixed member and the movable body are both mounted. Further, since one end of the movable body is supported by a fact that the movable body gear is engaged with the pinion and since another end of the movable body is supported by the lever bridged between the movable body and the fixed member, it is possible to support the movable body without protruding a base portion from the fixed member toward the movable body. Since the base portion is not disposed around the movable body, the movable body supporting mechanism suitable for the miniaturization and the light weight can be attained. Further, since the base portion is not necessary, only the achievement of the rigidity and the accuracy of the lever enables the movable body supporting mechanism with a high accuracy to be easily attained.

In one aspect of the first movable body supporting mechanism, it is further provided with: a fixed member gear (16a, 16b) mounted on the fixed member (11) at a side thereof opposite to the movable body (12) and engaged with the pinion (14a, 14b); and a rotational shaft (31) of the pinion mounted on the lever (13a, 13b).

According to this aspect, it is possible to gang the rotation of the lever with the rotation and up-and-down reciprocation of the pinion.

In this aspect, it may be further provided with a linkage mechanism (20, 15a, 15b, 17a, 17b), through which the lever (13a, 13b) is linked to the fixed member (11) and the movable body (12), for enabling the lever to be slid and rotated with respect to the fixed member and the movable body.

According to this aspect, as the lever is slid with respect to the fixed member and the movable body, it is possible to absorb the change in the distance accompanying the movement of the movable body from the linkage position between the lever and the fixed member to the linkage position between the lever and the movable body.

In this case of having the linkage mechanism, a lever ratio of (i) a distance from the linkage mechanism (20, 15a, 15b) at a side thereof opposed to the fixed member (11) to the rotational shaft (31) of the pinion (14a, 14b) with respect to (ii) a distance from the linkage mechanism (20, 15a, 15b) at the side thereof opposed to the fixed member to the linkage mechanism (20, 17a, 17b) at a side thereof opposed to the movable body (12) may be set to 1:2.

By setting the lever ratio to 1:2, the movement amount of the movable body gear position of the movable body and the movement amount of the linkage mechanism position of the movable body can be made equal to each other. Thus, the movable body moves while keeping its attitude parallel to the fixed member, i.e., performs a strictly parallel movement. Therefore, it is possible to attain the movable body supporting mechanism suitable for a disc changer in case of accommodating discs parallel to each other in a magazine.

Alternatively in this case of having the linkage mechanism, a lever ratio of (i) a distance from the linkage mechanism (20, 15a, 15b) on a side thereof opposed to the fixed member (11) to the rotational shaft (31) of the pinion (14a, 14b) with respect to (ii) a distance from the linkage mechanism (20, 15a, 15b) on the side thereof opposed to the fixed member (11) to the linkage mechanism (20, 17a, 17b) at a side thereof opposed to the movable body (12) may be selected to such a predetermined value as to support the movable body which carries out a rotational motion.

By setting the lever ratio in this manner, the lowering amount of the movable body gear position of the movable body becomes greater than the lowering amount of the linkage mechanism position of the movable body. Thus, since a rotational movement accompanies the lowering movement of the movable body, the movable body rotates around a aerial fulcrum outside of the movable body as a center. Thus, it is possible to attain the movable body supporting mechanism suitable for supporting the movable body which is rotationally driven. Therefore, for example, it is possible to attain the movable body supporting mechanism suitable for supporting the movable body, which is rotationally-driven around the aerial fulcrum, so as to keep its attitude parallel to the discs which are arranged radially with respect to the aerial fulcrum as a center in the magazine.

In another aspect of the first movable body supporting mechanism, the lever (46a, 46b) has a fulcrum (43) in the fixed member (41), the lever is linked through a linkage mechanism (48, 51) to the movable body (42), a rotational shaft (50) of the pinion (44a, 44b) is mounted in the fixed member, and a rotation of the pinion and a rotation of the lever are ganged by a deceleration device (45a, 45b, 49).

According to this aspect, since the lever has the fulcrum in the fixed member, it is possible to prevent the lever from causing a saccadic movement when it is rotating. Further, by virtue of the deceleration device, even if the lever has the fulcrum in the fixed member, it is possible to gang the rotation of the lever with the rotation of the pinion.

In this aspect, a movement of the movable body gear (52) with respect to the pinion (44a, 44b) may be decreased by a predetermined ratio by the deceleration device (45a, 45b, 49) and is then transmitted to a movement of the lever (46a, 46b) at a position of the deceleration device, and the movement of the lever at the position of the deceleration device may be increased by the predetermined ratio and is then transmitted to a movement of the movable body (42) at a position of the linkage mechanism (48, 51).

In this case, the movement amount of the movable body gear position of the movable body and the movement amount of the linkage mechanism position of the movable body can be made roughly equal to each other. Thus, the movable body moves while keeping its attitude roughly parallel to the fixed member. Therefore, it is possible to attain the movable body supporting mechanism suitable for a disc changer in case of accommodating discs parallel to each other in a magazine.

The above object of the present invention can be also achieved by a second movable body supporting mechanism for supporting a movable body (62) to be moved in a direction orthogonal to a flat surface on which a fixed member (61) and the movable body are both mounted. The second movable body supporting mechanism is provided with: a first lever (63) rotatably linked through one linkage mechanism (65, 67, 68) to the fixed member and the movable body; a second lever (64) rotatably linked through another linkage mechanism (66, 69, 70) to the fixed member and the movable body; and a ganging section (71) disposed between a pair of the one and another linkage mechanisms, which are respectively disposed on the fist lever and the second lever, for ganging the first lever and the second lever, wherein a length of the first lever and a length of the second lever are different from each other.

According to the second movable body supporting mechanism, by virtue of a rather simple configuration of the first lever, the second lever etc., it is possible to support the movable body to be moved in the direction orthogonal to the flat surface on which the fixed member and the movable body are both mounted. Further, since one end of the movable body is supported by the first lever bridged between the movable body and the fixed member and since another end of the movable body is supported by the lever bridged between the movable body and the fixed member, it is possible to support the movable body without protruding a base portion from the fixed member toward the movable body. Since the base portion is not disposed around the movable body, the movable body supporting mechanism suitable for the miniaturization and the light weight can be attained.

In one aspect of the second movable body supporting mechanism, a lever ratio of (i) a distance from the linkage mechanism (65) for the first lever (63) on a side thereof opposed to the fixed member (61) to the ganging section (71) with respect to (ii) a distance from the linkage mechanism for the first lever on the side thereof opposed to the fixed member to the linkage mechanism (68) for the first lever on a side opposed to the movable body (62) is equal to a lever ratio of (iii) a distance from the linkage mechanism (66) for the second lever (64) on a side opposed to the fixed member to the ganging section with respect to (iv) a distance from the linkage mechanism (66) for the second lever on the side thereof opposed to the fixed member to the linkage mechanism (70) for the second lever on a side thereof opposed to the movable body.

According to this aspect, the movement amount of the supporting position of the first lever and the movement amount of the supporting position of the second lever can be made roughly equal to each other. Thus, the movable body moves while keeping its attitude roughly parallel to the fixed member. Therefore, for example, it is possible to attain the movable body supporting mechanism suitable for a disc changer in case of accommodating discs parallel to each other in a magazine.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 15 is a perspective view showing an example that a synchronous gear is used in the movable body supporting mechanism in the second embodiment;

FIG. 16A is a side view shows an operation of the movably body supporting mechanism in a condition that a movable body located at a raised position in a third embodiment;

FIG. 16B is a side view shows an operation of the movably body supporting mechanism in a condition that the movable body is located at a lowered position in the third embodiment;

FIG. 17 is a side view showing another example of a ganging section of the movable body supporting mechanism in the third embodiment;

DETAILED DESCRIPTION OF THE PREFERRED EMBODIMENTS

Figure 1:
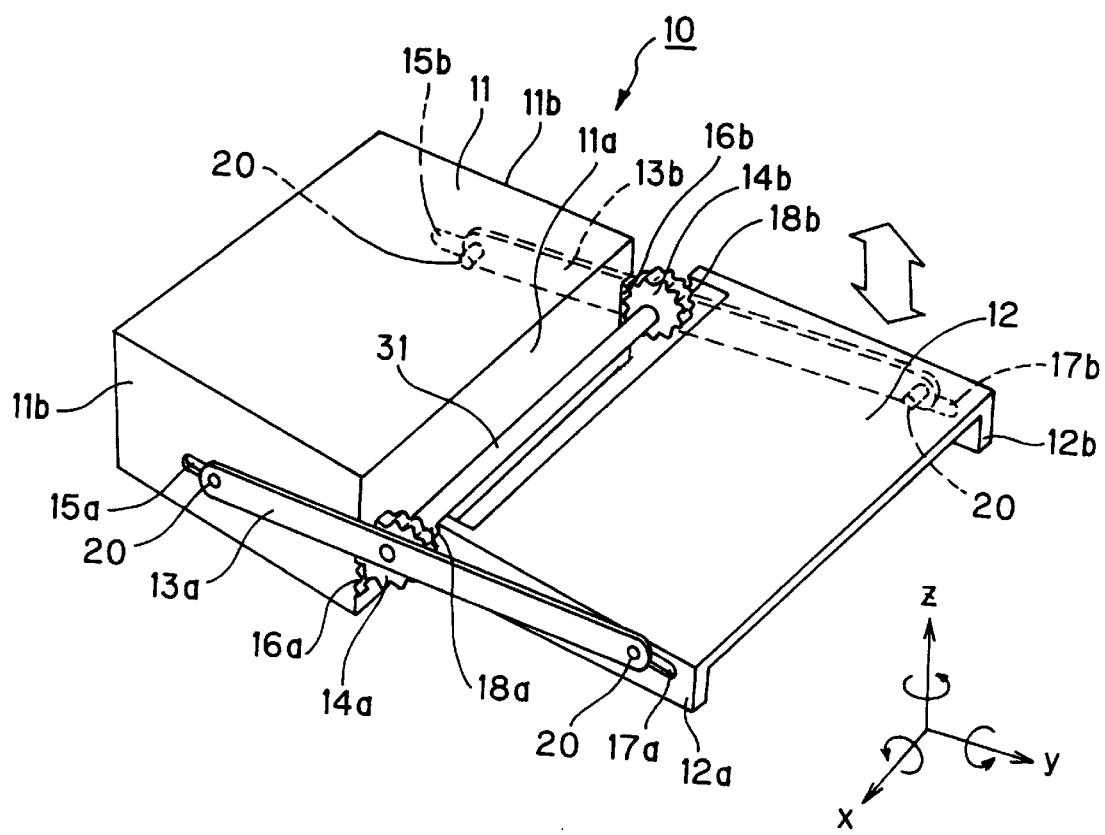
FIG. 1 is a perspective view showing a movable body supporting mechanism in a first embodiment of the present invention.
Figure 2:
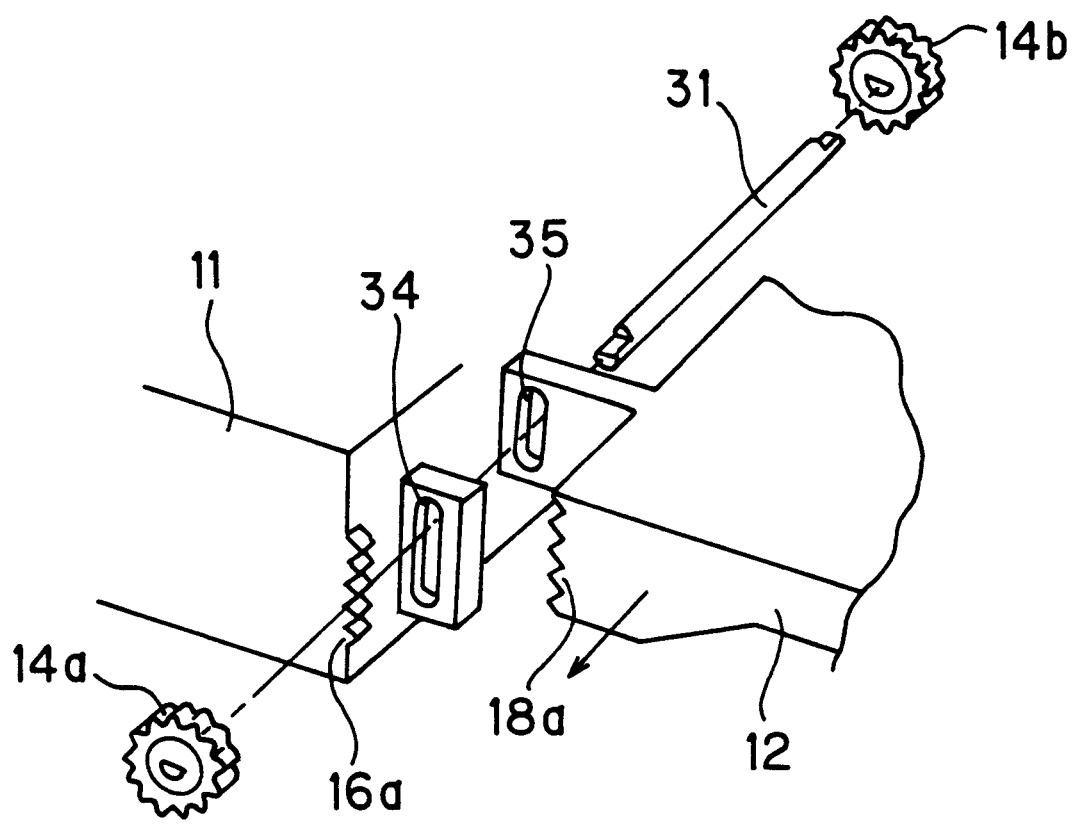
FIG. 2 is a perspective view showing a guide of a rotation shaft of the movable body supporting mechanism in the first embodiment.

FIGS. 1 to 3 show a movable body supporting mechanism 10 in a first embodiment of the present invention. In this movable body supporting mechanism 10, a movable body 12 is moved in a direction (Z axis direction) orthogonal to a flat surface (X-Y plane) on which a fixed member 11 and the movable body 12 are both mounted. The movable body supporting mechanism 10 is applied to, for example, a disc clamping mechanism for a disc player or a disc selecting mechanism for a changer. If it is applied to the disc clamper mechanism, a playing unit, such as a turn table, an optical pickup and the like, is disposed on the movable body 12. A disc is clamped between the turn table and a damper above the movable body 12 by moving the movable body 12 in the Z axis direction in FIGS. 1 to 3.

If it is applied to the disc selecting mechanism for the changer, the fixed member 11 is used as a magazine in which a plurality of discs are arrayed and accommodated at a predetermined pitch. A playing unit containing the turn table and the optical pickup and a carrying unit for carrying the disc from the magazine to a play position are disposed on the movable body 12. The movable body 12 is moved in the Z axis direction of FIGS. 1 to 3 while a parallel posture is maintained in line with a disc position accommodated in the magazine.

As shown in FIGS. 1 to 3, the movable body supporting mechanism 10 is provided with the fixed member 11, the movable body 12 mounted within a horizontal surface of the fixed member 11, a pair of levers 13a and 13b rotatably linked to each other between the fixed member 11 and the movable body 12, and pinions 14a and 14b mounted between the fixed member 11 and the movable body 12.

The fixed member 11 is substantially rectangular, and a pair of slender long holes 15a and 15b extending in a Y axis direction of FIGS. 1 to 3 are opened on both sides 11b in an X axis direction of the fixed member 11. A pair of fixed member racks 16a and 16b extending in the Z axis direction are mounted on both ends of a side surface 11a of the movable body 12 of the fixed member 11.

The movable body 12 is made of a plate-shaped member which is flat and rectangular. A length of the movable body 12 in the X axis direction thereof is substantially equal to a length in the X axis direction of the fixed member 11. Walls 12a and 12b are vertically mounted at both ends of the X axis direction of the movable body 12. A pair of long holes 17a and 17b slenderly extending in a Y axis direction are opened on the walls 12a and 12b opposite to the fixed member 11. Also, movable body racks 18a and 18b extending in the Z axis direction so as to be located opposite to the fixed member racks 16a and 16b are mounted on the side of the fixed member 11 of the walls 12a and 12b.

The pair of levers 13a and 13b slenderly extending on the side of the X axis direction of the fixed member 11 and the movable body 12 have pins 20 at both ends. The pins 20 are engaged with the long holes 15a and 15b opened in the fixed member 11 and the long holes 17a and 17b opened in the movable body 12. The levers 13a and 13b are linked through the pins 20 and the long holes 15a, 15b, 17a and 17b to the fixed member 11 and the movable body 12. The levers 13a and 13b can be rotated for the fixed member 11 and the movable body 12. The levers 13a and 13b can be slid for the fixed member 11 and the movable body 12. The change of a distance between the fixed member 11 and the movable body 12 in conjunction with the movement of the movable body 12 can be absorbed by the fact that the levers 13a and 13b are slid for the fixed member 11 and the movable body 12.

The pair of pinions 14a and 14b are positioned so as to be engaged with the fixed member racks 16a and 16b mounted on the fixed member 11 and the movable body racks 18a, 18b mounted on the movable body. Also, the pair of pinions 14a and 14b are fixed to a rotational shaft 31 so as not to be relatively rotated. This rotational shaft 31 is rotatably supported at centers of the pair of levers 13a and, 13b.

As shown in FIG. 2, the rotational shaft 31 is inserted through a long hole 34 opened at a rib projected from the fixed member 11 and a long hole 35 opened at a rib projected from the movable body 12. Accordingly, the movement in the Z axis direction of the rotational shaft 31 is guided by the long hole 34 and the long hole 35.

In addition, a known element, such as a shaft, a hole or the like, may be used as the guide for restricting the movement in the X axis direction or the Y axis direction of the movable body 12. Moreover, the movable body 12 is driven by driving one point of the movable body 12 or the levers 13a and 13b by using a device, such as a cam, a screw, a gear or the like.

Figure 3A:
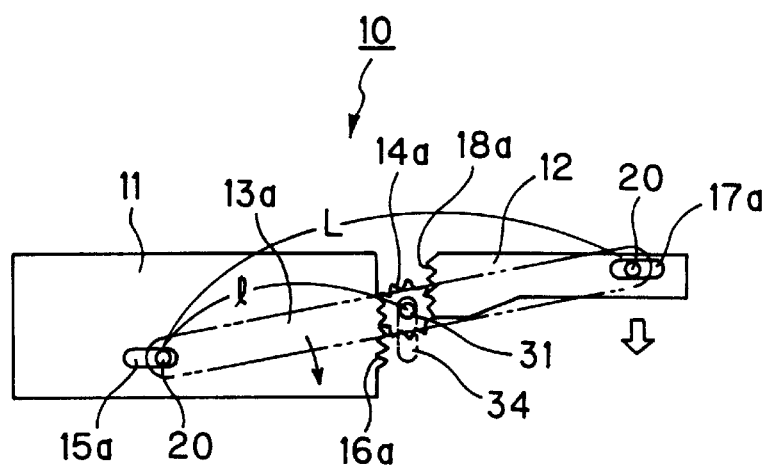
FIG. 3A is a side view shows an operation of the movably body supporting mechanism in a condition that a movable body is located at raised position in the first embodiment.
Figure 3B:
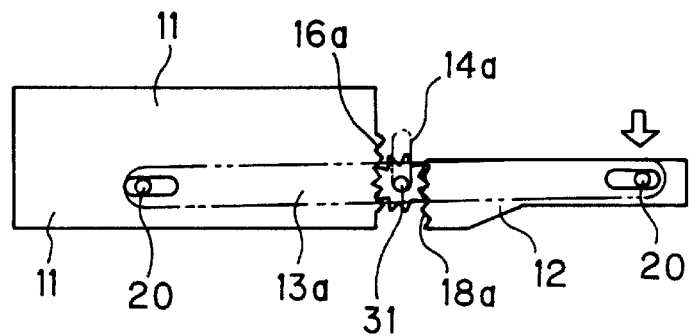
FIG. 3B is a side view shows an operation of the movably body supporting mechanism in a condition that the movable body is located at a lowered position in the first embodiment.

FIGS. 3A and 3B show the motions of the movable body supporting mechanism 10. FIG. 3A shows a condition that the movable body 12 is located at a raised position, and FIG. 3B shows a condition that the movable body 12 is located at a lowered position. In this movable body supporting mechanism 10, a ratio of 1: L is referred to as a lever ratio. Here, L is a distance from the pin 20 on the side of the fixed member 11 to the rotational shaft 31 of the pinion 14a, and L is a distance from the pin 20 on the side of the fixed member 11 to the pin 20 on the side of the movable body 12. In this movable body supporting mechanism 10, the rotational shaft 31 is mounted at the center between the pin 20 on the side of the fixed member 11 and the pin 20 on the side of the movable body 12. Thus, the lever ratio is set to 1:2.

As shown in FIG. 3A, one end of the movable body 12 is supported by a fact that the movable body rack 18a is engaged with the pinion 14a, and the other end thereof is supported by the pin 20. Here, in order to lower it, one point of the lever 13a is rotated in a clockwise direction by a rotation mechanism. The pinion 14a is engaged with the fixed member rack 16a, and its shaft is mounted in the lever 13a. Thus, it is lowered while being rotated in the clockwise direction. Since this pinion 14a is also engaged with the movable body rack 18a, the rotation in the clockwise direction of the pinion 14a causes the movable body rack 18a to be lowered. Hence, the movable body rack 18a is lowered by the lowered amount, which is two times of that of the rotational shaft 31. On the other hand, the lever 13a is fitted in the long hole 15a of the fixed member 11 and the long hole 17a of the movable body 12, at the lever ratio of 1:2. So, the pin 20 on the side of the movable body 12 is lowered by the lowered amount, which is two times of that at the position of the rotational shaft 31 of the lever 13a. Therefore, the pins 20 on the sides of the movable body 12 and the movable body rack 18a are lowered by the same lowered amount, so that the movable body 12 is lowered in parallel with the fixed member 11, as shown in FIG. 3B.

Figure 4:
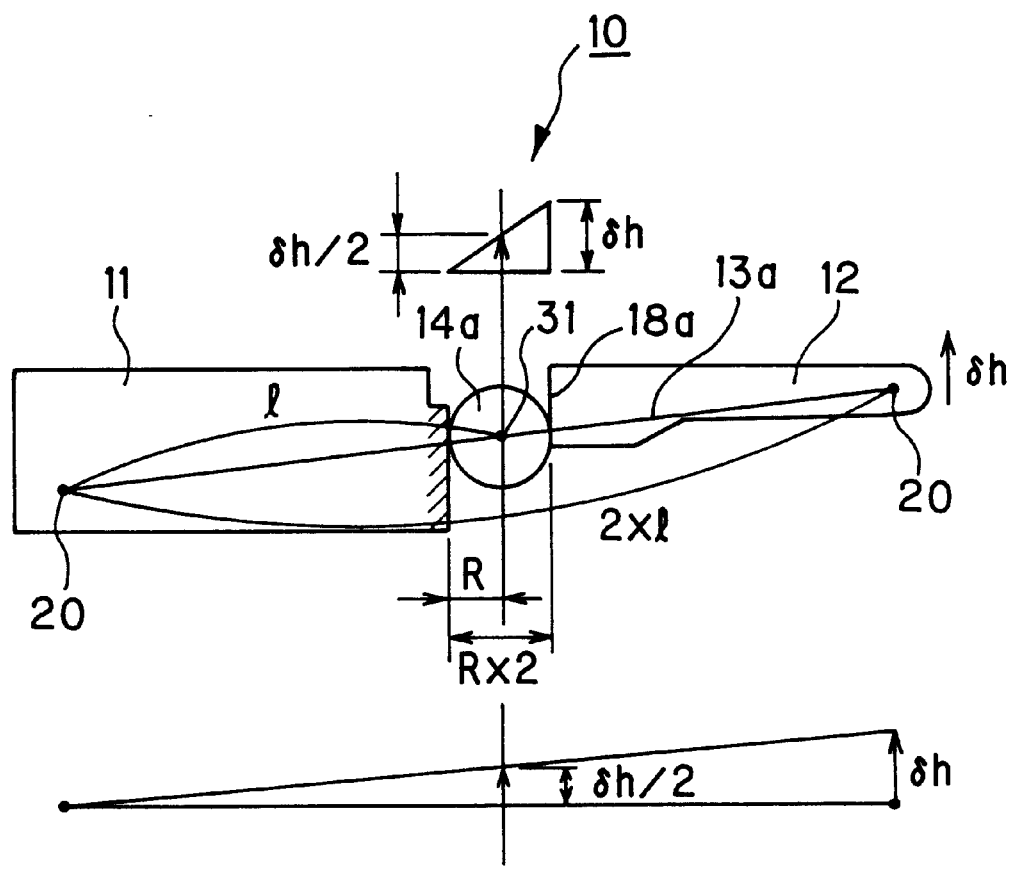
FIG. 4 is a view showing a principle of the movable body supporting mechanism in the first embodiment.

FIG. 4 shows the principle of the movable body supporting mechanism 10. When the lever 13a is rotated and the movable body rack 18a is raised by δh, the rotational shaft 31 of the pinion 14a is raised by δh/2. Since the lever ratio is set to 1:2, as mentioned above, when the rotational shaft 31 is raised by δh/2, the pin 20 on the side of the movable body 12 is raised by δh. Hence, the movable body 12 can be raised while being kept parallel.

The pair of levers 13a and 13b and the pair of pinions 14a and 14b are mounted on both the sides in the X axis direction of the movable body 12 and the fixed member 11 so that the pair of pinions 14a and 14b are coupled so as not to be relatively rotated and thereby carry out the same motion. For this reason, substantially four corners of the movable body 12 are lowered by the same amount. Thus, the movable body 12 is cubicly lowered in the Z axis direction while the parallel posture to the fixed member 11 is maintained. The motion in the Z axis direction in this condition that the movable body 12 is kept parallel is referred to as a strictly parallel motion.

As mentioned above, according to the movable body supporting mechanism 10 of the present embodiment, the mechanism having a simple configuration provided with the pinions 14a and 14b, the levers 13a and 13b etc., can support the movable body 12 to be moved in the Z axis direction. Also, the one end of the movable body 12 is supported by the fact that the movable body rack 18a is engaged with the pinion 14a, and the other end of the movable body 12 is supported by the lever 13a linked between the movable body 12 and the fixed member 11. For this reason, it is possible to support the movable body 12 without projecting a base from the fixed member 11 toward underneath the movable body 12. The movable body supporting mechanism 10 suitable for the miniaturization and the light weight can be attained since the base is not mounted underneath the movable body 12. Moreover, since the base which is difficult to obtain the rigidity is not necessary, only the achievement of the rigidity and the accuracy of the levers 13a and 13b enables the movable body supporting mechanism 10 with a high accuracy to be easily attained.

Figure 5A:
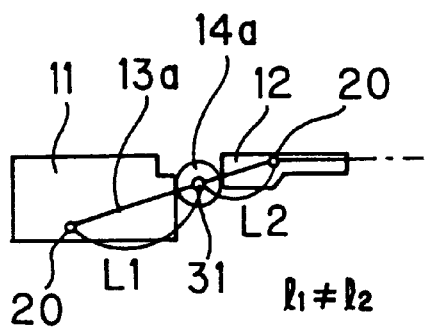
FIG. 5A is a side view shows an example of a rotation operation of the movably body supporting mechanism in a condition that a movable body is located at a raised position in the first embodiment.
Figure 5B:
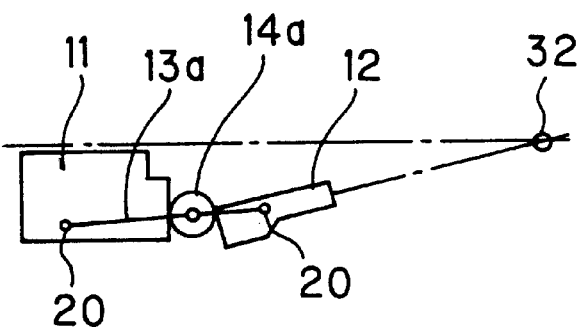
FIG. 5B is a side view shows an example of a rotation operation of the movably body supporting mechanism in a condition that the movable body is located at a lowered position in the first embodiment.

FIGS. 5A and 5B show conditions that the movable body 12 is rotated with an aerial fulcrum point 32 as a center. FIG. 5A shows a condition before the rotation of the movable body 12, and FIG. 5B shows a condition after the rotation of the movable body 12. Here, a distance from the pin 20 on the side of the fixed member 11 of the lever 13a to the rotational shaft 31 is set to L1, and a distance from the rotational shaft 31 to the pin 20 on the side of the movable body of the lever 131 is set to L2. The distance L1 is set to be longer than the distance L2, and a lever ratio is set to 1:1 to 2 (i.e., a numeral that is equal to or greater than 1 and less than 2). Such setting of the lever ratio causes the lowered amount on the side of the fixed member 11 of the movable body 12 to be greater than that at the position of the pin 20 of the movable body 12. For this reason, the rotation motion is accompanied by the lowering operation of the movable body 12. Hence, the movable body 12 is rotated with the aerial fulcrum point 32 outside the movable body 12 as a center, as shown in FIG. 5B.

As mentioned above, the movable body 12 is rotatably supported with the aerial fulcrum point 32 as the center. Thus, for example, even if the discs are radially positioned on the fixed member 11, the respective discs can be kept parallel to the movable body 12. Moreover, it is not necessary to extend the movable body 12 up to the aerial fulcrum point 32 and rotatably support the movable body 12 at the aerial fulcrum point 32. Hence, it is possible to extremely reduce a depth of the movable body 12.

Figure 6:
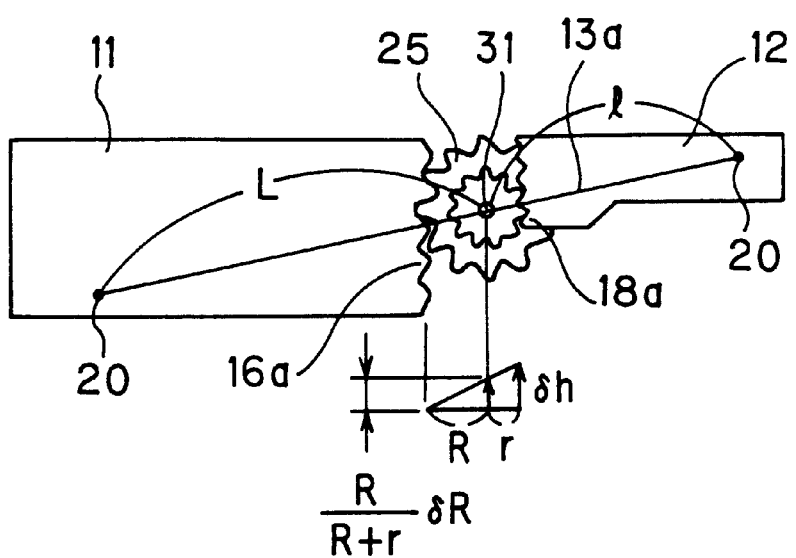
FIG. 6 is a side view showing another example of a pinion of the movable body supporting mechanism in the first embodiment.

FIG. 6 shows another example of a pinion 25. In this example, a two-stage gear is used in the pinion 25, a gear having a small diameter of a pitch circle radius r is engaged with the movable body rack 18a, and a gear having a large diameter of a pitch circle radius R is engaged with the fixed member rack 16a. In this way, the pinion 25 is not limited to a gear of a single tooth number. Then, the pinion 25 may be constituted by a combination of the two-stage gear.

The principle in which the two-stage gear is combined with the pinion 25 will be described below. When the movable body rack 18a is raised by δh, the rotational shaft 31 of the pinion 25 is raised by R×δh/(R+r). The lever ratio of the lever 13a is L:l+L. Thus, if it is set to l/L=r/R, the pin 20 on the side of the movable body 12 is raised by δh. Hence, even if the two-stage gear is used in the pinion 25, the setting of the lever ratio to a predetermined value enables the movable body 12 to carry out the strictly parallel motion. In addition, in this case, if the large gear and the small gear are respectively selected such that the ratio of the numbers of teeth is 1 or integer times, it is not necessary to take care of a phase at a time of assembling. Therefore, the assembling is easy.

Figure 7:
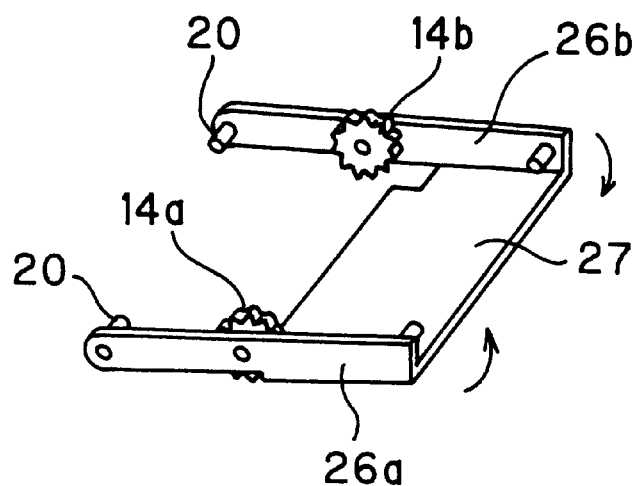
FIG. 7 is a perspective view showing another example of a lever of the movable body supporting mechanism in the first embodiment.

FIG. 7 shows another example of levers 26a and 26b. As shown in FIG. 7, a pair of levers 26a and 26b may be connected to a linkage plate 27 having a high torsional rigidity. Since the pair of levers 26a and 26b are linked to the linkage plate 27, it is not necessary to fix the pinions 14a and 14b to the rotational shaft 31. Thus, it is possible to design a configuration in which the respective pinions 14a and 14b can be freely rotated. Moreover, if the rigidity of the movable body 12 can be sufficiently obtained, the pinions 14a and 14b may be mounted in either one of them. Also in the movable body supporting mechanism 10, if the entire rigidity can be obtained, either one of the levers 13a and 13b may be omitted.

Figure 8:
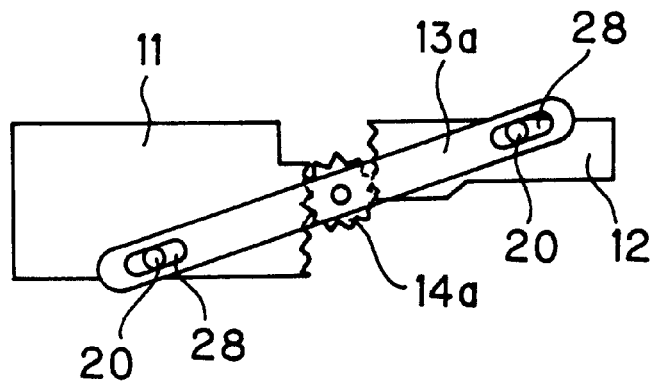
FIG. 8 is a side view showing an example that a long hole is formed in the lever of the movable body supporting mechanism in the first embodiment.

FIG. 8 shows another connection example with regard to the lever 13a, the fixed member 11 and the movable body 12. As shown in FIG. 8, long holes 28 may be formed at both ends in a longitudinal direction of the lever 13a, and pins 20 engaged with the long holes 28 may be mounted on the sides of the fixed member 11 and the movable body 12. The levers 13a and 13b are rotated and further slid for the fixed member 11 and the movable body 12. Thus, the change of the distance between the fixed member 11 and the movable body 12 in conjunction with the movement of the movable body 12 can be absorbed similarly to the movable body supporting mechanism 10 in the first embodiment.

Figure 9:
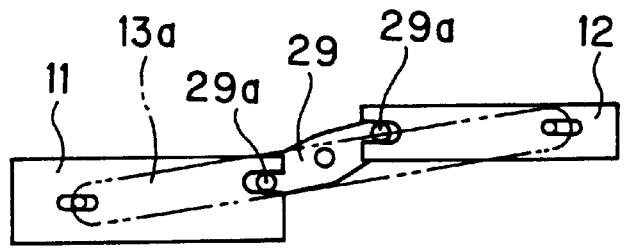
FIG. 9 is a side view showing an example that a pin gear is used in the movable body supporting mechanism in the first embodiment.

FIG. 9 shows another example of a pinion 29. If the movement amount of the movable body 12 is small, it is not necessary that the pinion 29 is an entire circumference gear. The pinion 29 composed of pin gears each having, for example, two to four pins 29a in circle sections may be substituted.

Figure 10:
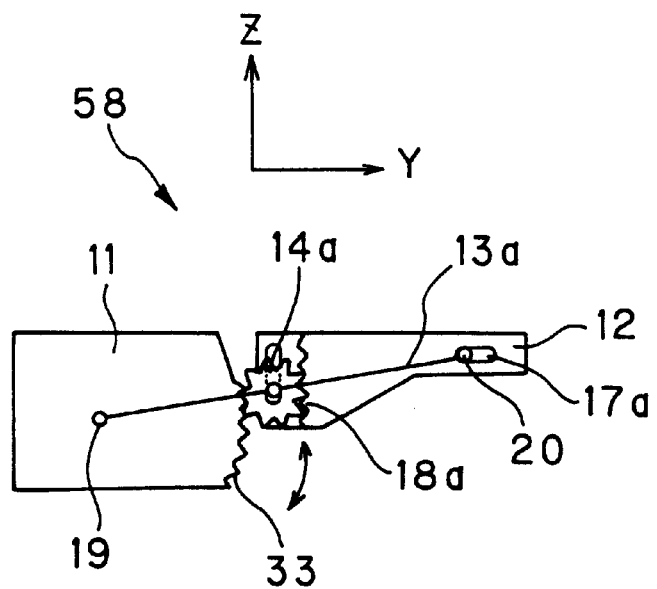
FIG. 10 is a side view showing an example that a little movement is allowable in a Y axis direction of the movable body supporting mechanism in the first embodiment.

FIG. 10 shows a movable body supporting mechanism 58, if a little movement in the Y axis direction of the movable body 12 is allowable. In this movable body supporting mechanism 58, a lever 13a is rotated around a fixing point 19 of the fixed member 11. A large diameter gear 33 is formed on the fixed member 11, and a pinion 14a is fitted in this large diameter gear 33. The other configuration is similar to that of the movable body supporting mechanism 10. Even in this movable body supporting mechanism 58 in FIG. 10, the little movement in the Y axis direction is accompanied. However, the movable body 12 can be moved in the Z axis direction in a condition that the parallel posture is maintained. In addition, the fixing point 19 may be mounted on the side of the movable body 12.

Figure 11:
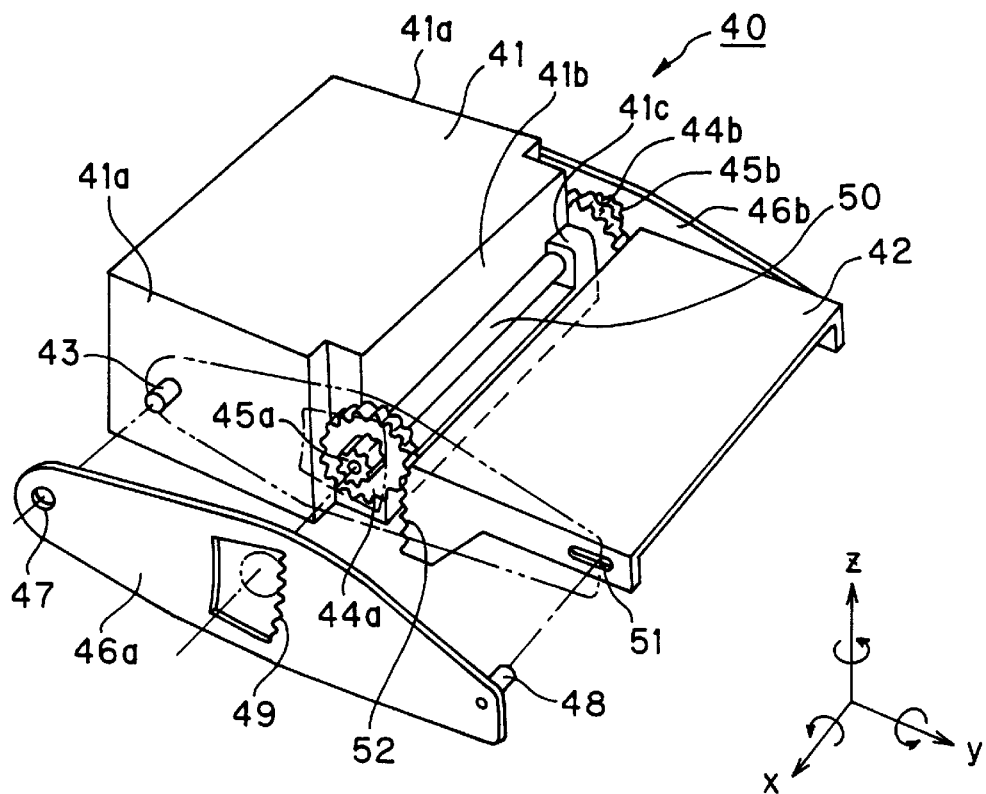
FIG. 11 is a perspective view showing a movable body supporting mechanism in a second embodiment of the present invention.
Figure 12A:
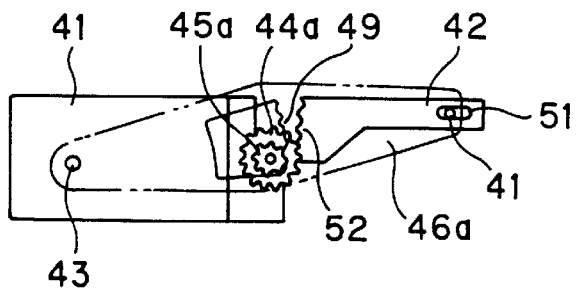
FIG. 12A is a side view shows an operation of the movably body supporting mechanism in a condition that a movable body is located at a raised position in the second embodiment.
Figure 12B:
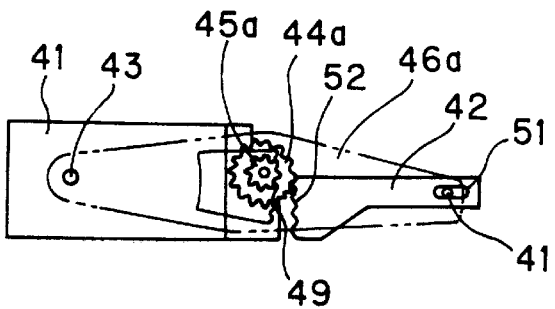
FIG. 12B is a side view shows an operation of the movably body supporting mechanism in a condition that the movable body is located at a lowered position in the second embodiment.
Figure 13:
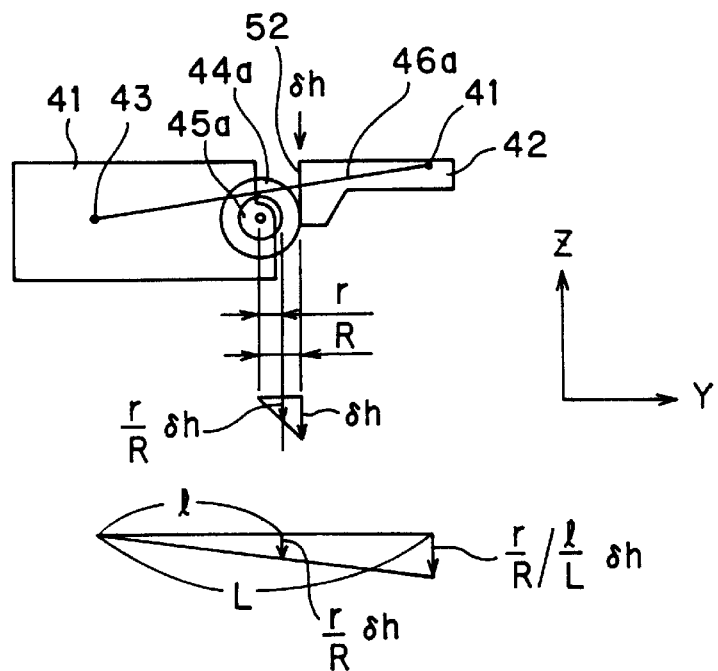
FIG. 13 is a view showing a principle of the movable body supporting mechanism in the second embodiment.

FIGS. 11 to 13 show a movable body supporting mechanism 40 in a second embodiment of the present invention. As shown in FIG. 11, in this movable body supporting mechanism 40, a fixed member pin 43 is fixed on a side surface 41a in an X axis direction of a fixed member 41. A pair of levers 46a and 46b bridging between the fixed member 41 and a movable body 42 have pin fitting holes 47 respectively at one ends on the side of the fixed member 41. The fixed member pin 43 is engaged with the pin fitting hole 47 respectively. Also, lever pins 48 are fixed at the other ends on the side of the movable body 42 of the levers 46a and 46b resepctively. The lever pins 48 are engaged with long holes 51 slenderly opened on the sides of the movable body 42 Large gears 49 are formed near centers of the levers 46a and 46b.

Shaft bushes 41c for supporting a rotational shaft 50 of pinions 44a and 44b are mounted on a side 41b of the movable body 42 of the fixed member 41. Differently from the movable body supporting mechanism 10, the pinions 44a and 44b are not moved in the Z axis direction. Then, they are rotated around the rotational shaft 50. Also, inner gears 45a and 45b having the same rotation center are respectively fixed in X axis direction end surfaces of the pinions 44a and 44b respectively. The inner gear 45a and 45b are respectively engaged with the large gears 49 formed on the levers 46a and 46b, and rotated in the same direction.

FIGS. 12A and 12B show the motions of the movable body supporting mechanism 40. FIG. 12A shows a condition that the movable body 42 is located at a raised position, and FIG. 12B shows a condition that the movable body 42 is located at a lowered position. In the movable body 42, the side of the fixed member 41 is supported by a fact that a movable body rack 52 is engaged with a pinion 44a, and the opposite side of the fixed member 41 is supported by a lever pin 48 mounted in the lever 46a. Here, in order to lower it, one point of the lever 46a is rotated in a clockwise direction by a rotation mechanism with the fixed member pin 43 as a center. The lever 46a has a support point (fulcrum) in the fixed member 41. Thus, it is possible to prevent the lever 46a from being shaken when it is rotated. Since the large gear 49 mounted in the lever 46a is engaged with the inner gear 45a fixed in the pinion 44a, the pinion 44a is rotated in the clockwise direction by the rotation of the lever 46a. Since this pinion 44a is also engaged with the movable body rack 52, the movable body rack 52 is lowered by the rotation of the pinion 44a. Also, the long holes 51 of the movable body 42 are lowered in conjunction with the clockwise rotation of the lever 46a.

FIG. 13 shows the principle of the movable body supporting mechanism 40. When the lever 45a is rotated and the movable body rack 52 is lowered by δh, the lever 46a engaged with the inner gear 45a is lowered by r δh/R at the position where it is engaged with the inner gear 45a. Here, let us suppose that a pitch circle radius of the inner gear 45a is r and a pitch circle radius of the pinion 44a is R. The lowered operation of the amount of r×δh/R at the position where the lever 46a is engaged with the inner gear 45a causes the movable body 42 to be lowered by δ×(r/R)l(l/L) at the position of the long hole 51. Here, 1 is a length in a Y axis direction from the position of the fixed member pin 43 of the lever 46a to the position where the lever 46a is engaged with the inner gear 45a, and L is a length in a Y axis direction from the position of the fixed member pin 43 of the lever 46a to the position of the lever pin 41. In this embodiment, the lever 46a is rotated without being slid around the fixed member pin 43. Thus, the ratio of l:L is changed in conjunction with the rotation of the lever 46a. For this reason, the ratio of l:L cannot be always kept constant. Hence, it is impossible to obtain the strictly parallel motion of the movable body 42. So, a little rotation is accompanied for the fixed member 41. However, the l/L can be made closer to the r/R by the following setting. That is, the ratio of the length from the position of the fixed member pin 43 to the position where the lever 46a is engaged with the inner gear 45a, with respect to the length from the position of the fixed member pin 43 to the position of the lever pin 41, namely, the lever ratio is set to r:R. Therefore, this setting enables the movable body 12 to carry out an approximately parallel motion close to the strictly parallel motion.

Figure 14:
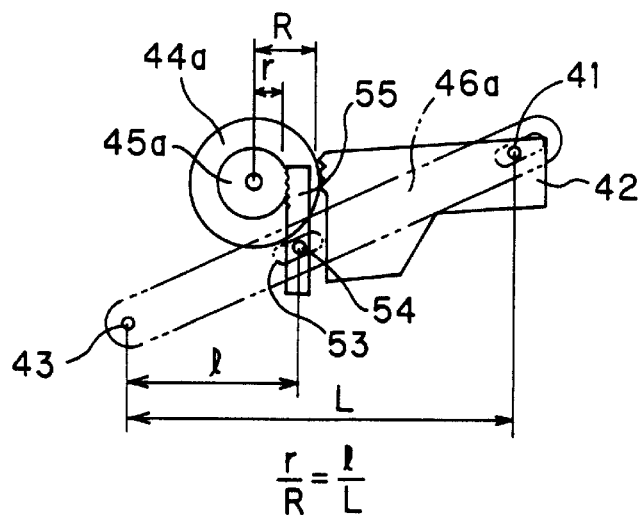
FIG. 14 is a side view showing an example that a strictly parallel motion of the movable body supporting mechanism is carried out in the second embodiment.
Figure 18:
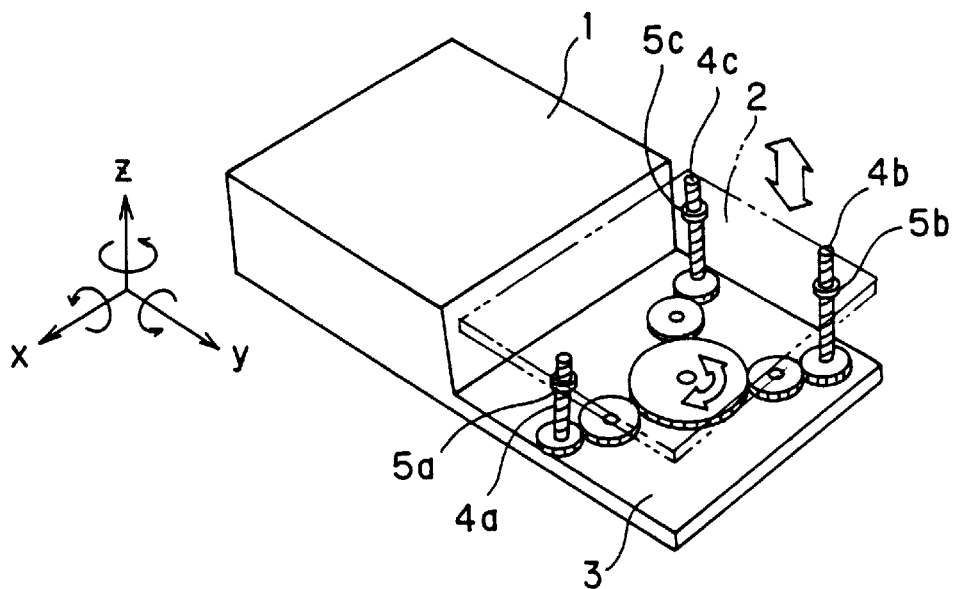
FIG. 18 is a side view showing one example of a movable body supporting mechanism.

In addition, even if the lever 46a is rotated, the ratio of l:L can be always kept constant by mounting an idling rack 55 engaged with the inner gear 45a and then inserting a rack pin 54 mounted in this idling rack 55 through a long hole 53 opened in the lever, as shown in FIG. 14. Thus, a lever ratio of a length from the fixed member pin 43 to the rack pin 54 with respect to a length from the fixed member pin 43 to the lever pin 41 is set to r:R to thereby enable the movable body 12 to carry out the strictly parallel motion.

The pair of pinions 44a and 44b are not limited to the type synchronized by the rotational shaft 50. If the pair of levers 46a and 46b are integrated with each other to thereby have the torsional rigidity, the pinions 44a and 44b may be mounted independently of each other. Moreover, just one of the pinions 44a and 44b may be used. Also, synchronous gears 56 engaged with the pinions 44a and 44b may be separately mounted as shown in FIG. 15. In this case, it is not necessary to mount the rotational shaft 50 between the pinion 42a and the pinion 42b. Accordingly, there is the space of the rotational shaft 50. Thus, for example, the disc can be passed between the pinion 44a and the pinion 42b.

FIGS. 16A and 16B show a movable body supporting mechanism 60 in a third embodiment of the present invention. A first lever 63 and a second lever 64 are rotatably linked to each other between a fixed member 61 and a movable body 62 which are mounted in juxtaposition. The first lever 63 has a rotational support point 65 at one end on the fixed member 61, and has a pin 68 engaged with a long hole 57 formed in the movable body 62 at the other end. A ganging long hole 72 extending in a longitudinal direction is opened near a center of the first lever 63. The second lever 64 also has a rotational support point 66 at one end of the fixed member 61, and has a pin 70 engaged with a long hole 69 formed in the movable body 62 at the other end. A length of the second lever 64 is shorter than that of the first lever 63. In the second lever 64, a ganging pin 71 is mounted near a center between the rotational support point 66 and the pin 70. This ganging pin 71 is engaged with the ganging long hole 72 opened in the first lever 63.

Figure 19:
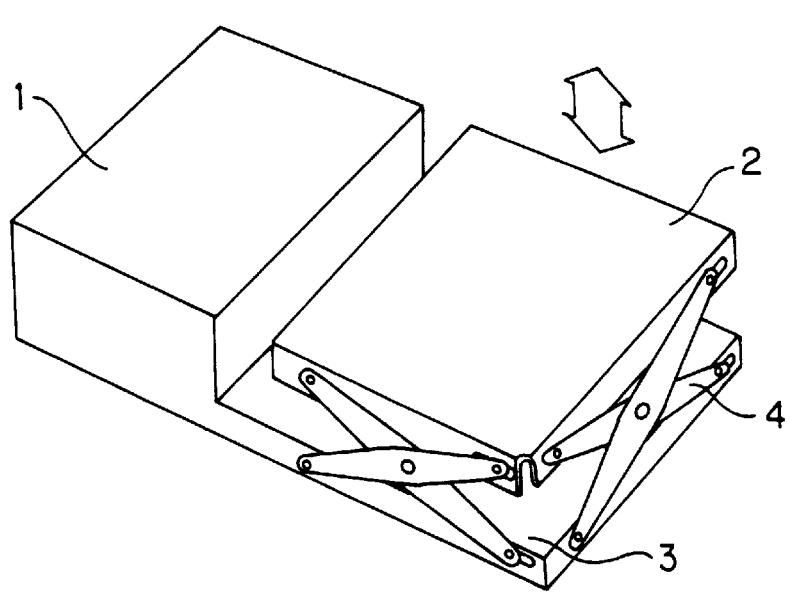
FIG. 19 is a side view showing another example of a movable body supporting mechanism.

According to this movable body supporting mechanism 60, the simple mechanism composed of the first lever 63, the second lever 64 etc., can support the movable body 62 to be moved in a Z axis direction. Also, the one end of the movable body 62 is supported by the first lever 63, and the other end of the movable body 62 is supported by the second lever 64. Thus, it is possible to support the movable body 62 without projecting a base from the fixed member 61 toward underneath the movable body 62. In addition, in the conventional X links refer to FIG. 19), the respective links are basically constituted in the same length. Hence, there is only a manner of supporting at the base projected from the fixed member 61, and it cannot be supported directly from the fixed member 61.

Heights in the Z axis direction of the rotational support point 65 of the first lever 63 and the rotational support point 66 of the second lever 64 are set to be equal to each other. Also, a lever ratio of the first lever 63 and a lever ratio of the second lever 64 are set to be equal to each other. Here, the lever ratio of the first lever 63 implies a ratio of a distance l from the rotational support point 65 to the ganging pin 71 with respect to a distance L from the rotational support point 65 to the pin 68, namely, a ratio of l:L. Also, the lever ratio of the second lever 64 implies a ratio of a distance r from the rotational support point 66 to the ganging pin 71 with respect to a distance R from the rotational support point 66 to the pin 70, namely, a ratio of r:R.

Since the lever ratio of the first lever 63 and the lever ratio of the second lever 64 are set to be equal to each other, a movement amount of the pin 70 mounted in the first lever 63 and a movement amount of the pin 68 mounted in the second lever 64 can be set to be approximately equal to each other. Thus, the movable body 62 can be moved in approximately parallel with the fixed member. In addition, this principle of the movable body supporting mechanism 60 may be considered by applying the respective symbols r, R, l and L to the above-mentioned principle of the movable body supporting mechanism 40. This movable body supporting mechanism 60 is suitable for the case where the movable body 62 is especially moved at a small stroke.

FIG. 17 shows another example of the ganging pin 71. The ganging pin 71 is not limited to the type that it is mounted at an intersection of the first lever 63 and the second lever 64. As shown in FIG. 17, it may be designed that the first lever 63 and the second lever 64 are arranged in parallel with each other, and a ganging long hole 72 and a ganging long hole 84 are opened near respective centers. A ganging pin 81 and a ganging pin 82 which are respectively engaged with the ganging long hole 72 and the ganging long hole 84 are fixed to a slide axis 80 that is movable in the Z axis direction.

As mentioned above, according to the present invention, the movable body supporting mechanism is provided with: the lever rotatably linked to the fixed member and the movable body; the movable body rack mounted on the side of the fixed member of the movable body; and the pinion engaged with the movable body rack and further driven in conjunction with the lever. Thus, even the simple mechanism can support the movable body to be moved in the direction orthogonal to the flat surface on which the fixed member and the movable body are both mounted. Moreover, the one end of the movable body is supported by the fact that the movable body rack is engaged with the pinion, and the other end of the movable body is supported by the lever linked between the movable body and the fixed member. Hence, it is possible to support the movable body without projecting the base from the fixed member toward underneath the movable body. It is not necessary to mount the base around the movable body. Therefore, it is possible to achieve the movable body supporting mechanism suitable for the miniaturization and the light weight.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-274581 filed on Sep. 29, 1998 including the specification, claims, drawings and summary is incorporated herein by reference in its entirety.

What is claimed is:

1. A movable body supporting mechanism comprising a moving mechanism, a movable body and a fixed member, for supporting said movable body to be moved in a direction orthogonal to a flat surface on which said fixed member and said movable body are both mounted, wherein said moving mechanism comprises:

a lever rotatably linked to said fixed member and said movable body;

a movable body gear mounted on said movable body at a side thereof opposed to said fixed member; and a pinion engaged with said movable body gear and driven in conjunction with said lever.

2. A movable body supporting mechanism according to claim 1, wherein said moving mechanism further comprises:

a fixed member gear mounted on said fixed member at a side thereof opposite to said movable body and engaged with said pinion; and a rotational shaft of said pinion mounted on said lever.

3. A movable body supporting mechanism according to claim 2, wherein said moving mechanism further comprises a linkage mechanism, through which said lever is linked to said fixed member and said movable body, for enabling said lever to be slid and rotated with respect to said fixed member and said movable body.

4. A movable body supporting mechanism according to claim 3, wherein a lever ratio of (i) a distance from said linkage mechanism at a side thereof opposed to said fixed member to said rotational shaft of said pinion with respect to (ii) a distance from said linkage mechanism at the side thereof opposed to said fixed member to said linkage mechanism at a side thereof opposed to said movable body is set to 1:2.

5. A movable body supporting mechanism according to claim 3, wherein a lever ratio of (i) a distance from said linkage mechanism on a side thereof opposed to said fixed member to said rotational shaft of said pinion with respect to (ii) a distance from said linkage mechanism on the side thereof opposed to said fixed member to said linkage mechanism at a side thereof opposed to said movable body is selected to such a predetermined value as to support said movable body which carries out a rotational motion.

6. A movable body supporting mechanism according to claim 1, wherein said lever has a fulcrum in said fixed member, said lever is linked through a linkage mechanism to said movable body, a rotational shaft of said pinion is mounted in said fixed member, and a rotation of said pinion and a rotation of said lever are ganged by a deceleration device.

7. A movable body supporting mechanism according to claim 6, wherein a movement of said movable body gear with respect to said pinion is decreased by a predetermined ratio by said deceleration device and is then transmitted to a movement of said lever at a position of said deceleration device, and the movement of said lever at the position of said deceleration device is increased by said predetermined ratio and is then transmitted to a movement of said movable body at a position of said linkage mechanism.

8. A movable body supporting mechanism comprising a moving mechanism, a movable body and a fixed member for supporting said movable body to be moved in a direction orthogonal to a flat surface on which said fixed member and said movable body are both mounted, wherein said moving mechanism comprises:

a first lever rotatably linked through one linkage mechanism to said fixed member and said movable body;

a second lever rotatably linked through another linkage mechanism to said fixed member and said movable body; and a ganging section disposed between a pair of said one and another linkage mechanisms, which are respectively disposed on said first lever and said second lever, for ganging said first lever and said second lever, and a length of said first lever and a length of said second lever are different from each other.

9. A movable body supporting mechanism according to claim 8, wherein a lever ratio of (i) a distance from said linkage mechanism for said first lever on a side thereof opposed to said fixed member to said ganging section with respect to (ii) a distance from said linkage mechanism for said first lever on the side thereof opposed to said fixed member to said linkage mechanism for the first lever on a side opposed to said movable body is equal to a lever ratio of (iii) a distance from said linkage mechanism for said second lever on a side opposed to said fixed member to said ganging section with respect to (iv) a distance from said linkage mechanism for said second lever on the side thereof opposed to said fixed member to said linkage mechanism for said second lever on a side thereof opposed to said movable body.

* * * * *